(12) United States Patent
Sugahara et al.

(10) Patent No.: US 12,512,233 B2
(45) Date of Patent: Dec. 30, 2025

(54) WIRE HARNESS AND ELECTRIC COMPRESSOR

(71) Applicants: KABUSHIKI KAISHA TOYOTA JIDOSHOKKI, Kariya (JP); SUMITOMO WIRING SYSTEMS, LTD., Yokkaichi (JP)

(72) Inventors: Akito Sugahara, Kariya (JP); Shinya Nakamura, Kariya (JP); Takahiro Suzuki, Kariya (JP); Shigehiro Kasho, Kariya (JP); Hiroto Ujihara, Yokkaichi (JP); Hiroki Yamanouchi, Yokkaichi (JP)

(73) Assignees: KABUSHIKI KAISHA TOYOTA JIDOSHOKKI, Kariya (JP); SUMITOMO WIRING SYSTEMS, LTD., Yokkaichi (JP)

( * ) Notice: Subject to any disclaimer, the term of this patent is extended or adjusted under 35 U.S.C. 154(b) by 312 days.

(21) Appl. No.: 18/283,312

(22) PCT Filed: Mar. 24, 2022

(86) PCT No.: PCT/JP2022/013810
§ 371 (c)(1),
(2) Date: Sep. 21, 2023

(87) PCT Pub. No.: WO2022/202957
PCT Pub. Date: Sep. 29, 2022

(65) Prior Publication Data
US 2024/0096520 A1 Mar. 21, 2024

(30) Foreign Application Priority Data
Mar. 25, 2021 (JP) ................. 2021-051715

(51) Int. Cl.
*H01B 7/00* (2006.01)
*H02K 5/22* (2006.01)
(52) U.S. Cl.
CPC ........... *H01B 7/0045* (2013.01); *H02K 5/225* (2013.01)

(58) Field of Classification Search
CPC ....... F04B 49/06; H01B 7/009; H01B 7/0258; H01B 7/202; H01B 7/0045; H01B 7/186;
(Continued)

(56) References Cited

U.S. PATENT DOCUMENTS 2,922,835 A * 1/1960 Lehr ................. H01B 11/1025
174/105 R
2,991,328 A * 7/1961 Lay ..................... H02G 3/0487
174/72 A
(Continued)

FOREIGN PATENT DOCUMENTS

JP 2004-350406 A 12/2004
JP 2011-163231 A 8/2011
(Continued)

OTHER PUBLICATIONS

International Search Report for PCT/JP2022/013810 dated Jun. 7, 2022 (PCT/ISA/210).

*Primary Examiner* — Thomas Fink
(74) *Attorney, Agent, or Firm* — Sughrue Mion, PLLC

(57) ABSTRACT

A wire harness includes a first connector and a second connector respectively provided at opposite ends of a cable, protective members that are arranged side by side in a longitudinal direction of the cable and cover the cable, a first fixing member that is provided on the protective member closest to the first connector and configured to fix the wire harness to a mounting target, and a second fixing member that is provided on the protective member closest to the second connector and configured to fix the wire harness to the mounting target. The cable is covered with the protective members in an entire region between the first fixing member and the second fixing member. End portions of each pair of the protective members that are adjacent to each other in the longitudinal direction overlap with each other to slide on each other, thereby forming a sliding portion.

3 Claims, 5 Drawing Sheets

(58) Field of Classification Search
CPC .... H01B 9/022; H02K 5/255; B60R 16/0207; B60R 16/0215
See application file for complete search history.

(56) References Cited

U.S. PATENT DOCUMENTS

| | | | | |
|---|---|---|---|---|
| 2011/0272547 | A1* | 11/2011 | Gotou | H02G 3/32 |
| | | | | 248/224.8 |
| 2013/0032393 | A1* | 2/2013 | Toyama | B60R 16/0215 |
| | | | | 174/72 A |
| 2013/0049550 | A1 | 2/2013 | Watanabe et al. | |
| 2014/0311796 | A1* | 10/2014 | Gannon | H01B 7/2825 |
| | | | | 174/72 A |
| 2017/0316851 | A1* | 11/2017 | Poehmerer | H01B 13/2613 |
| 2018/0037176 | A1* | 2/2018 | Kodama | B60R 16/0215 |
| 2021/0257127 | A1* | 8/2021 | Shimizu | H01B 7/18 |
| 2021/0296025 | A1* | 9/2021 | Sugihara | H01B 7/421 |
| 2023/0124892 | A1* | 4/2023 | Iwama | H02G 3/30 |
| | | | | 174/75 R |
| 2023/0290540 | A1* | 9/2023 | Maruchi | B60R 16/0215 |
| 2024/0051478 | A1* | 2/2024 | Ma | B60R 16/0207 |
| 2024/0121930 | A1* | 4/2024 | Fujioka | H02G 3/0462 |

FOREIGN PATENT DOCUMENTS

| | | |
|---|---|---|
| JP | 2019-083655 A | 5/2019 |
| JP | 2020-122449 A | 8/2020 |

* cited by examiner

WIRE HARNESS AND ELECTRIC COMPRESSOR

CROSS REFERENCE TO RELATED APPLICATIONS

This application is a National Stage of International Application No. PCT/JP2022/013810 filed Mar. 24, 2022, claiming priority based on Japanese Patent Application No. 2021-051715 filed Mar. 25, 2021.

TECHNICAL FIELD

The present disclosure relates to a wire harness and a motor-driven compressor.

BACKGROUND ART

Generally, a wire harness is connected to a vehicle on-board device. Wire harnesses are desired to have impact resistance so as not to be broken at the time of a vehicle collision or during normal use. Some wire harnesses have a multilayer structure in which a cable is protected by protective members to have impact resistance. Further, a wire harness is routed to be disposed at a predetermined position. In order to maintain the routed state of the wire harness, fixing members provided on the wire harness are attached to predetermined mounting positions in the vehicle. In such a wire harness, the core wires of the cable are integrated with a vehicle on-board device such as an inverter in advance (for example, see Patent Literature 1).

CITATION LIST

Patent Literature

Patent Literature 1: Japanese Laid-Open Patent Publication No. 2011-163231

SUMMARY OF INVENTION

Technical Problem

A wire harness includes connectors provided at end portions of a cable and attached to a vehicle on-board device. The electrical contacts of the connectors may be worn and deformed by vibrations transmitted from the cable. Thus, among multiple fixing members, a more stringent tolerance for the mounting position is required for the fixing member situated closest to each connector compared to other fixing members. During transportation or packaging, a wire harness may be bundled by bending the wire harness alone or by bending the wire harness with at least one end being connected to a vehicle on-board device. The force applied to the wire harness by the bending causes all of the protective members to move in one direction. Due to the movement of the protective members, the positions of the fixing members are displaced in the longitudinal direction of the wire harness. In particular, when a wire harness is integrated with a vehicle on-board device as in Patent Literature 1, the fixing members are likely to be displaced since the wire harness and the vehicle on-board device are transported in a state in which the cable of the wire harness is wound around the vehicle on-board device.

Solution to Problem

In one general aspect, a wire harness includes a cable, a first connector provided at one end of the cable, a second connector provided at another end of the cable, protective members, a first fixing member, and a second fixing member. The protective members cover the cable and are arranged side by side in a longitudinal direction of the cable. The first fixing member is provided on one of the protective members that is closest to the first connector. The first fixing member is configured to fix the wire harness to a mounting target. The second fixing member is provided on one of the protective members that is closest to the second connector. The second fixing member is configured to fix the wire harness to the mounting target. The cable is covered with the protective members in an entire region between the first fixing member and the second fixing member. End portions of each pair of the protective members that are adjacent to each other in the longitudinal direction overlap with each other to slide on each other, thereby forming a sliding portion.

In another general aspect, a motor-driven compressor includes the above-described wire harness, a compression unit configured to compress a fluid, an electric motor configured to drive the compression unit, an inverter configured to drive the electric motor, and a housing that accommodates the electric motor. The first connector is fixed to the housing and electrically connected to the inverter.

DESCRIPTION OF EMBODIMENTS

Embodiments

A wire harness and a motor-driven compressor according to an embodiment will now be described with reference to FIGS. 1 to 7. The motor-driven compressor of the present embodiment is used, for example, in a vehicle air conditioner.

Figure 1:
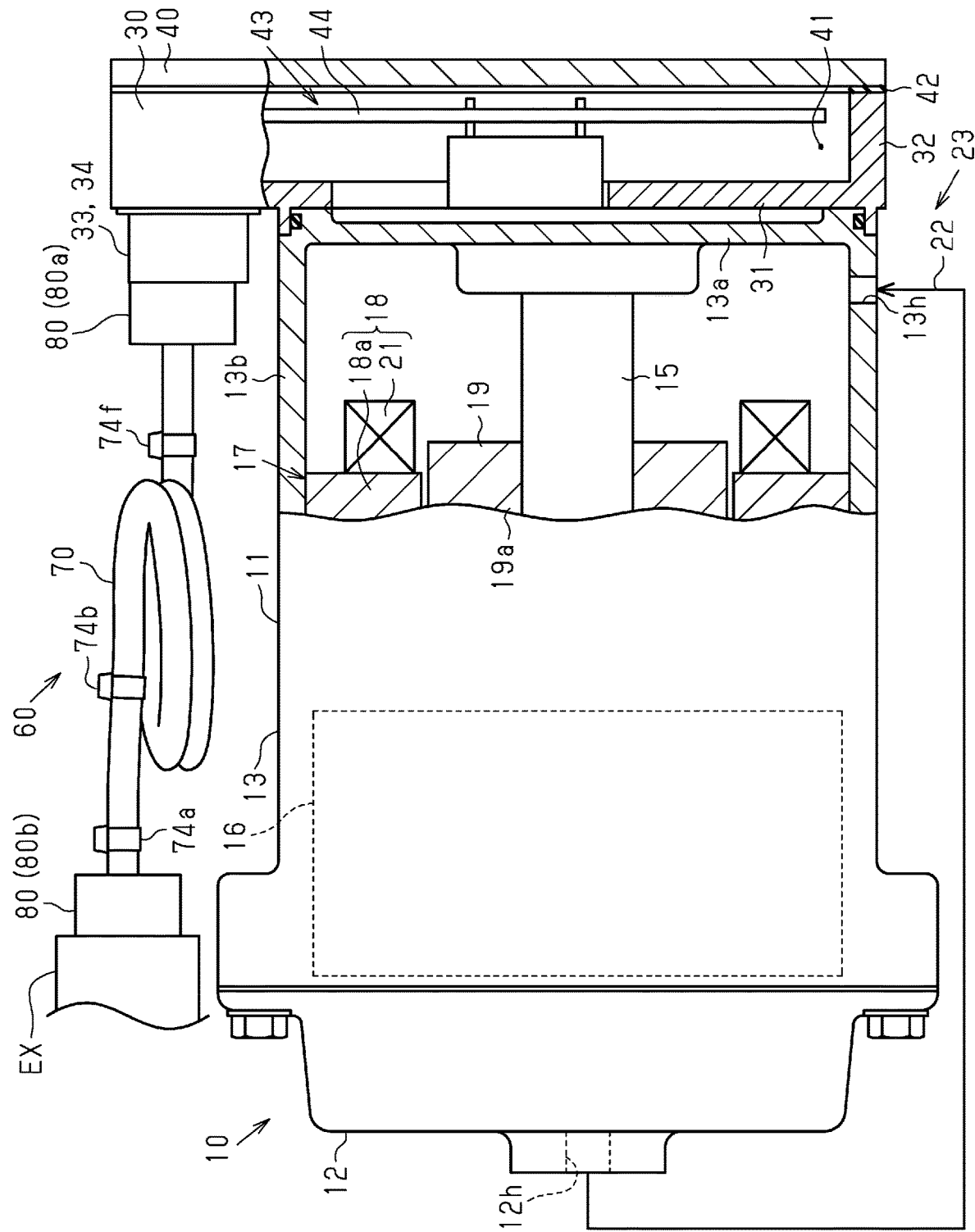
FIG. 1 is a partially cut away cross-sectional side view showing a motor-driven compressor according to an embodiment.

[Overall Configuration] As shown in FIG. 1, the motor-driven compressor 10 includes a housing 11 made of metal. The housing 11 includes a discharge housing member 12 and a motor housing member 13 coupled to the discharge housing member 12. The discharge housing member 12 and the motor housing member 13 are made of, for example, aluminum. The motor housing member 13 has a plate-shaped end wall 13a and a tubular peripheral wall 13b, which extends from the outer periphery of the end wall 13a. The motor housing member 13 includes a suction port 13h in the peripheral wall 13b. Refrigerant, which is fluid, is drawn into the motor housing member 13 through the suction port 13h.

The motor housing member 13 accommodates a rotary shaft 15. The rotary shaft 15 is accommodated in the motor housing member 13 with the axis of the rotary shaft 15 agreeing with the axis of the peripheral wall 13b of the motor housing member 13. The motor housing member 13 accommodates a compression unit 16 and an electric motor 17. The compression unit 16 is driven by rotation of the rotary shaft 15 to compress the refrigerant. The electric motor 17 rotates the rotary shaft 15 to drive the compression unit 16. The housing 11 thus accommodates the compression unit 16 and the electric motor 17. The compression unit 16 and the electric motor 17 are arranged in an axial direction, in which the axis of the rotary shaft 15 extends. The electric motor 17 is located closer to the end wall 13a of the motor housing member 13 than the compression unit 16 is.

The compression unit 16 is, for example, of a scroll type that includes a fixed scroll (not shown) fixed in the motor housing member 13 and a movable scroll (not shown) opposed to the fixed scroll.

The electric motor 17 includes a tubular stator 18 and a rotor 19, which is arranged on the inner side of the stator 18. The rotor 19 rotates integrally with the rotary shaft 15. The stator 18 surrounds the rotor 19. The rotor 19 includes a rotor core 19a, which is fixed to the rotary shaft 15, and permanent magnets (not shown), which are provided on the rotor core 19a. The stator 18 includes a tubular stator core 18a and a motor coil 21, which is wound about the stator core 18a.

The suction port 13h is connected to an end of an external refrigerant circuit 22. The discharge housing member 12 has a discharge port 12h. The discharge port 12h is connected to another end of the external refrigerant circuit 22. Refrigerant that has been drawn into the motor housing member 13 from the external refrigerant circuit 22 through the suction port 13h is compressed by the compression unit 16 when the compression unit 16 operates. The compressed refrigerant flows out to the external refrigerant circuit 22 through the discharge port 12h. The refrigerant that has flowed out to the external refrigerant circuit 22 returns to the motor housing member 13 through the suction port 13h via a heat exchanger and an expansion valve (neither is shown) of the external refrigerant circuit 22. The motor-driven compressor 10 and the external refrigerant circuit 22 form a vehicle air conditioner 23.

As shown in FIG. 1, the motor-driven compressor 10 includes an inverter case 30. The inverter case 30 includes a plate-shaped case end wall 31 and a tubular case peripheral wall 32, which extends from the outer periphery of the case end wall 31. The case end wall 31 faces the end wall 13a of the motor housing member 13. The case end wall 31 is attached to the end wall 13a of the motor housing member 13, so that the inverter case 30 is coupled to the motor housing member 13. An external power supply connector receiving portion 33 and a control connector receiving portion 34 protrude from the case end wall 31 of the motor housing member 13.

The motor-driven compressor 10 includes a plate-shaped inverter cover 40, which closes the opening of the case peripheral wall 32. The inverter cover 40 defines an inverter accommodating chamber 41 together with the inverter case 30. Furthermore, the motor-driven compressor 10 includes an annular gasket 42 interposed between the opening end face of the case peripheral wall 32 and the inverter cover 40.

The gasket 42 provides a seal between the opening end face of the case peripheral wall 32 and the inverter cover 40.

The motor-driven compressor 10 includes an inverter 43. The inverter 43 includes a circuit board 44, which drives the electric motor 17. The inverter 43 is accommodated in the inverter accommodating chamber 41. In other words, the inverter accommodating chamber 41 accommodates the inverter 43. The compression unit 16, the electric motor 17, and the inverter 43 are arranged in that order in the axial direction of the rotary shaft 15.

A wire harness 60 for connecting the motor-driven compressor 10 to an external power supply and a controller is connected to the external power supply connector receiving portion 33 and the control connector receiving portion 34. In the following description, the external power supply and the controller are collectively referred to as an external device EX.

[Details of Wire Harness 60]

Hereinafter, the wire harness 60 will be described in detail with reference to FIGS. 2 to 6. The wire harness 60 includes a cable 70, a first connector 80a, a second connector 80b, a protective member 72, a waterproof member 73, a sliding portion 90, and fixing members 74.

Figure 3:
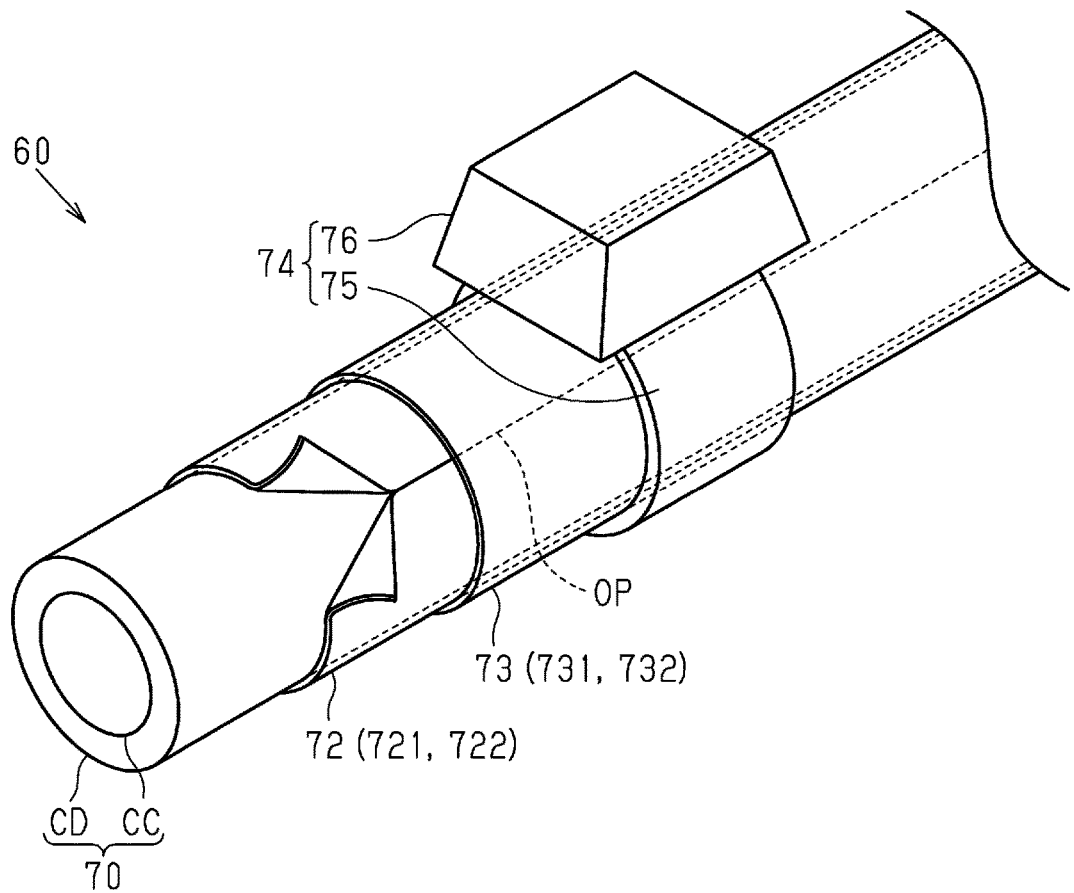
FIG. 3 is a perspective view showing part of the wire harness shown in FIG. 1.

As shown in FIG. 3, the cable 70 incudes core wires CC and an insulating coating CD. The core wires CC are covered with the insulating coating CD. The core wires CC include a power feeding core wire CC and a controlling core wire CC.

Figure 4:
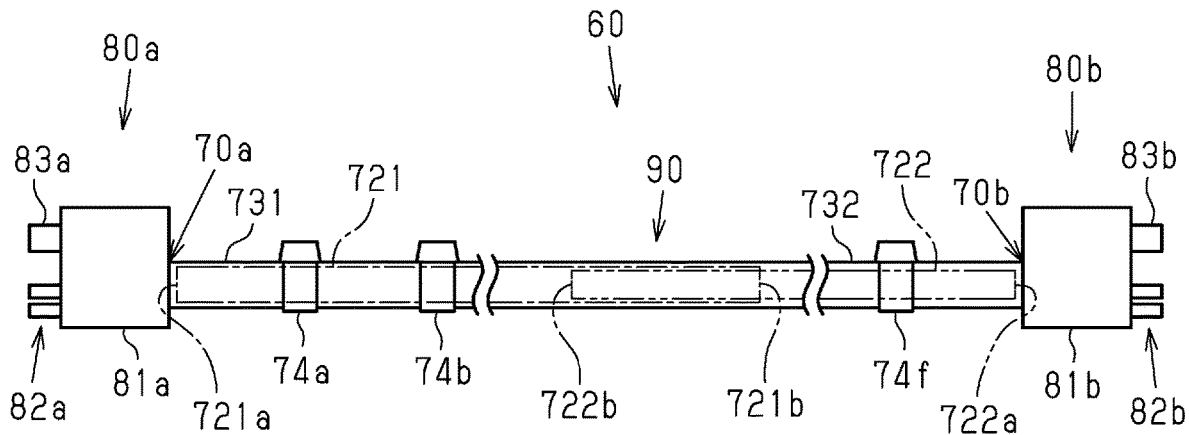
FIG. 4 is a diagram showing an example of the wire harness shown in FIG. 1.

As shown in FIG. 4, the first connector 80a is provided at a first end portion 70a of the cable 70. The second connector 80b is provided at a second end portion 70b of the cable 70. The first connector 80a covers the first end portion 70a of the cable 70. The second connector 80b covers the second end portion 70b of the cable 70.

Figure 2:
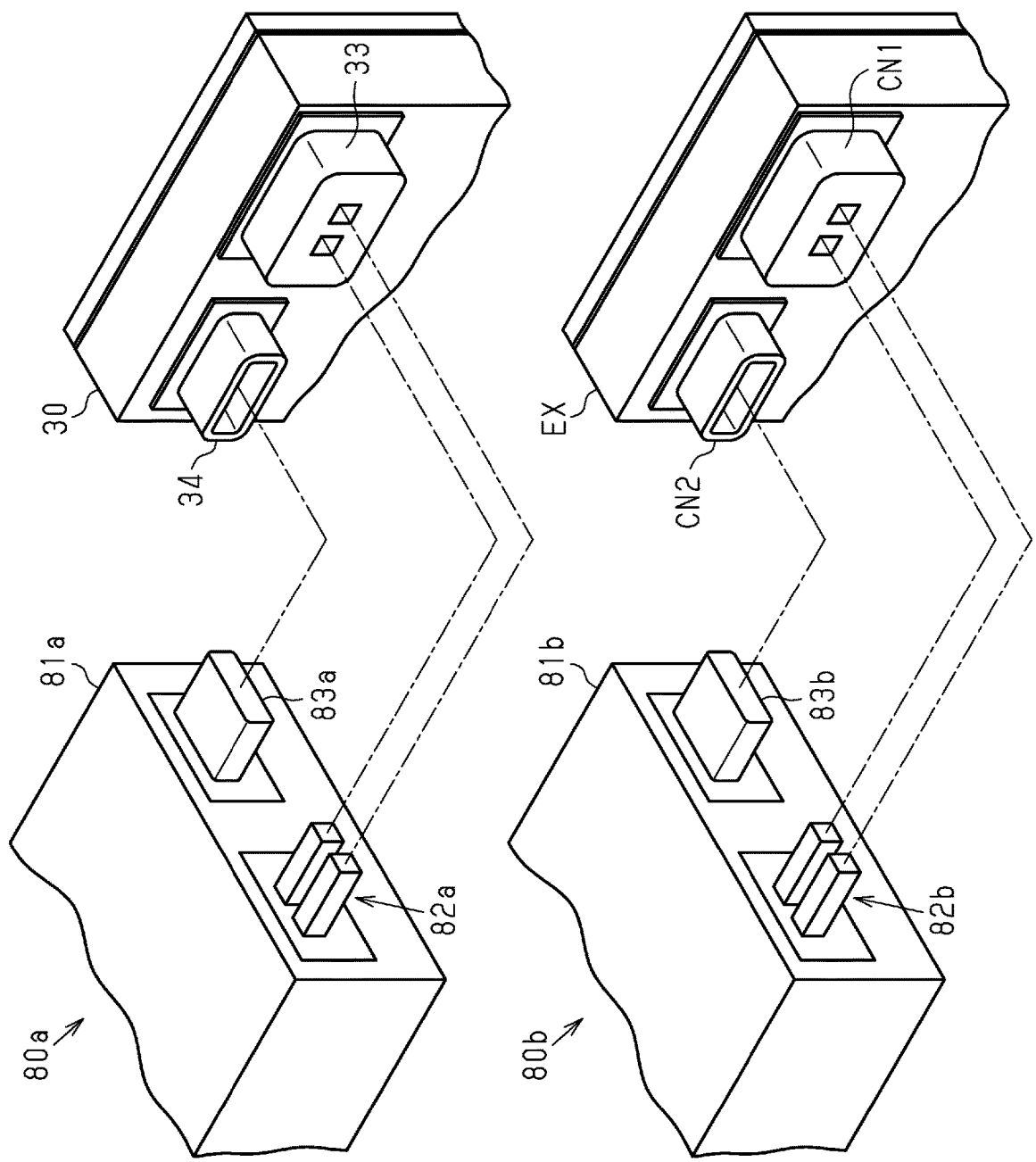
FIG. 2 is an exploded perspective view showing a connector receiving portion of the motor-driven compressor shown in FIG. 1, a connector receiving portion of an external device, and part of a wire harness connected to the connector receiving portions.

As shown in FIGS. 2 and 3, the first connector 80a includes a first connector housing 81a, and terminals 82a and 83a connected to end portions of the core wires CC. The second connector 80b includes a second connector housing 81b, and terminals 82b and 83b connected to end portions of the core wires CC. The terminal 82a provided in the first connector housing 81a and the terminal 82b provided in the second connector housing 81b are power feeding terminals connected to the power feeding core wire CC. The terminals 83a provided in the first connector housing 81a and the terminals 83b provided in the second connector housing 81b are control terminals connected to the control core wire CC. The terminals 82a and 83a are each an example of a first terminal. The terminals 82b and 83b are each an example of a second terminal.

As shown in FIG. 2, the first connector 80a is connected to the external power supply connector receiving portion 33 and the control connector receiving portion 34 of the motor-driven compressor 10. The first connector 80a is fixed to the housing 11 and electrically connected to the inverter 43 by being connected to the external power supply connector receiving portion 33 and the control connector receiving portion 34. The second connector 80b is connected to an external power supply connector receiving portion CN1 and a control connector receiving portion CN2 of the external device EX. The first connector 80a is fitted to the external power supply connector receiving portion 33 and the control connector receiving portion 34, and the second connector 80b is fitted to the external power supply connector receiving portion CN1 and the control connector receiving portion CN2. As a result, the motor-driven compressor 10 and the external device EX are electrically connected each other by the wire harness 60.

As shown in FIGS. 3 and 4, the protective member 72 includes a first protective member 721 and a second protective member 722. The first protective member 721 and the second protective member 722 are arranged side by side in the longitudinal direction of the cable 70. The first protective member 721 extends along the cable 70 from the first connector 80a to a position between the first connector 80a and the second connector 80b. The second protective member 722 extends along the cable 70 from the second connector 80b to a position between the first connector 80a and the second connector 80b. The waterproof member 73 includes a first waterproof member 731 and a second waterproof member 732. The first waterproof member 731 and the second waterproof member 732 are arranged side by side in the longitudinal direction of the cable 70. The first waterproof member 731 extends from the first connector 80a to a position between the first connector 80a and the second connector 80b. The second waterproof member 732 extends from the second connector 80b to a position between the first connector 80a and the second connector 80b. In the following description, when the first protective member 721 and the second protective member 722 are not distinguished from each other, they are collectively referred to as the protective member 72. When the first waterproof member 731 and the second waterproof member 732 are not distinguished from each other, they are collectively referred to as the waterproof member 73.

The cable 70 is substantially entirely covered with the protective member 72 and the waterproof member 73. Of the first protective member 721 and the first waterproof member 731, the first protective member 721 is provided closer to the cable 70 than the first waterproof member 731 is. That is, the first waterproof member 731 is provided around the first protective member 721. Of the second protective member 722 and the second waterproof member 732, the second protective member 722 is provided closer to the cable 70 than the second waterproof member 732 is. That is, the second waterproof member 732 is provided around the second protective member 722.

The protective member 72 is formed from, for example, a member having a specified impact resistance. Since the cable 70 is covered with the protective member 72, the impact resistance of the cable 70 is increased as compared with a case in which the cable 70 is not covered with the protective member 72. The waterproof member 73 is formed from, for example, a member having a specified waterproof performance and a specified dust-proof performance. Since the cable 70 is covered with the waterproof member 73, the waterproof performance and the dustproof performance of the cable 70 are improved as compared with a case in which the cable 70 is not covered with the waterproof member 73.

The protective member 72 has, for example, a tubular shape and is formed to accommodate the cable 70 inside. The protective member 72 has a slit OP extending over the entire length. The cable 70 is accommodated in the protective member 72 from the slit OP of the protective member 72. If the protective member 72 can cover the entire cable 70 in the circumferential direction of the cable 70, the protective member 72 may have a circumference sufficiently longer than the circumference of the cable 70. In this case, the opposite end portions of the protective member 72 in the circumferential direction overlap with each other.

The waterproof member 73 is, for example, a tape-shaped member, and is spirally wound around the protective member 72, which accommodates the cable 70. Accordingly, the waterproof member 73 blocks the gap between the opposite end portions of the protective member 72 in the circumferential direction, thereby preventing the cable 70 from being exposed from the gap between the opposite end portions of the protective member 72 in the circumferential direction. The waterproof member 73 closes a gap between the outer peripheral surface of the cable 70 and the inner peripheral surface of the protective member 72 at the opposite end portions in the longitudinal direction of the protective member 72.

Figure 6:
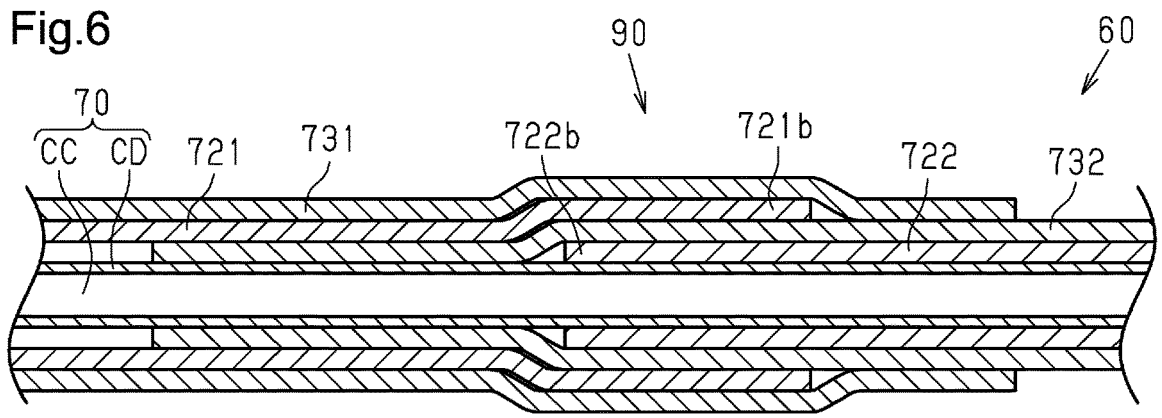
FIG. 6 is a cross-sectional side view showing a sliding portion shown in FIG. 4.

As shown in FIG. 6, the wire harness 60 has a multilayer structure composed of the protective member 72 and the waterproof member 73. Specifically, the wire harness 60 has a two-layer structure including the first protective member 721 and the first waterproof member 731 in a range from the first connector 80a to a position between the first connector 80a and the second connector 80b. The first protective member 721, which constitutes the inner layer of the two-layer structure, is movable in the longitudinal direction of the cable 70 between the outer peripheral surface of the cable 70 and the inner peripheral surface of the first waterproof member 731. The wire harness 60 has a two-layer structure including the second protective member 722 and the second waterproof member 732 in a range from the second connector 80b to a position between the first connector 80a and the second connector 80b. The second protective member 722, which constitutes the inner layer of the two-layer structure, is movable in the longitudinal direction of the cable 70 between the outer peripheral surface of the cable 70 and the inner peripheral surface of the second waterproof member 732.

Figure 5:
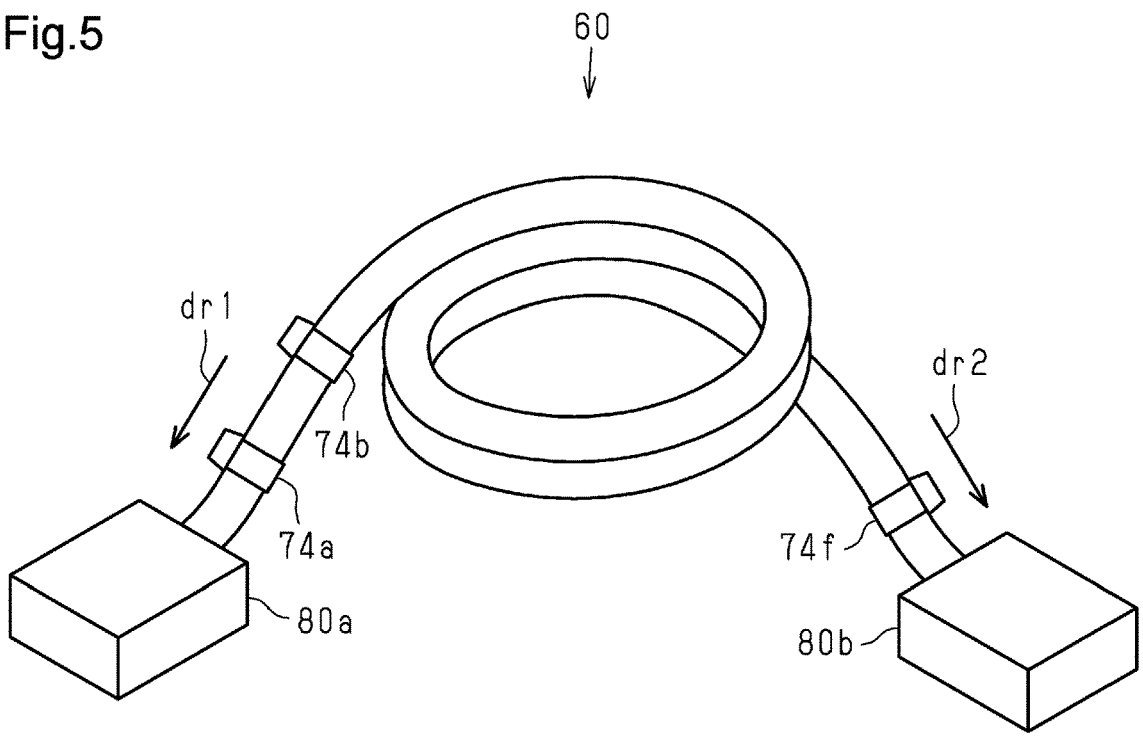
FIG. 5 is a view showing an example of a bundled wire harness.

As shown in FIGS. 4 and 5, the wire harness 60 is provided with the fixing members 74. For example, the fixing members 74 are provided outside the protective member 72 in the radial direction of the wire harness 60. In the present embodiment, the fixing members 74 are provided on the surface of the waterproof member 73. The fixing members 74 are used to fix the wire harness 60 to a mounting position, to which the wire harness 60 is attached. As described above, the motor-driven compressor 10 is used in the vehicle air conditioner 23 in the present embodiment. Therefore, the mounting position at which the wire harness 60 is installed is determined in advance in a mounting target such as a vehicle. Although not illustrated, for example, six mounting positions are provided on the vehicle.

As shown in FIG. 3, each fixing member 74 includes, for example, a ring portion 75 and a clip portion 76. The ring portion 75 is wound in the circumferential direction of the wire harness 60 and holds the cable 70, the protective member 72, and the waterproof member 73. The ring portion 75 and the clip portion 76 are joined to each other. The clip portion 76 fixes the cable 70 to the mounting position by being attached to the mounting position, for example.

As shown in FIGS. 4 and 5, the wire harness 60 is provided with six fixing members 74a to 74f, for example. These fixing members 74a to 74f are disposed at predetermined positions in the longitudinal direction of the wire harness 60 so that the wire harness 60 can be appropriately fixed to six mounting positions provided in the vehicle. Hereinafter, the positions of the fixing members 74a to 74f in the longitudinal direction of the wire harness 60 are referred to as designated positions. The designated positions are each designated based on, for example, the distance from the first connector 80a or the second connector 80b. In one example, the fixing members 74a to 74d are disposed at designated positions on the first protective member 721, and the designated positions are determined by distances from the first connector 80a. The fixing members 74e to 74f are disposed at designated positions on the second protective member 722, and the designated positions are determined by distances from the second connector 80b.

The fixing member 74a is a first fixing member provided on the first protective member 721, which is closest to the first connector 80a in the protective member 72. The fixing member 74f is a second fixing member provided on the second protective member 722, which is closest to the second connector 80b in the protective member 72. The fixing member 74a is disposed at one of the designated positions on the first protective member 721 that is closest to the first connector 80a. The fixing member 74d (not shown) is disposed at one of the designated positions on the first protective member 721 that is farthest from the first connector 80a. The fixing member 74f is disposed at one of the designated positions on the second protective member 722 that is closest to the second connector 80b. The fixing member 74e (not shown) is disposed at one of the designated positions on the second protective member 722 that is farthest from the second connector 80b.

The cable 70 is covered with the protective member 72 in the entire region between the fixing member 74a and the fixing member 74f. The fixing members 74 are provided on the protective member 72 via the waterproof member 73.

A first end portion 721a of the first protective member 721 is an end portion closer to the first connector 80a, and a second end portion 721b of the first protective member 721 is an end portion closer to the second protective member 722. A first end portion 722a of the second protective member 722 is an end portion closer to the second connector 80b, and a second end portion 722b of the second protective member 722 is an end portion closer to the first protective member 721. The second end portion 721b of the first protective member 721 and the second end portion 722b of the second protective member 722 overlap with each other.

As shown in FIG. 5, the wire harness 60 is bundled, either on its own or with at least the first connector 80a attached to the motor-driven compressor 10, through bending. In this case, due to the bending, a force may be applied to the wire harness 60, which causes a pulling force in the longitudinal direction of the wire harness 60, either in the direction (dr1) approaching the first connector 80a, or in the direction (dr2) approaching the second connector 80b.

The wire harness 60 of the present embodiment includes at least one sliding portion 90. The sliding portion 90 mitigates the displacement of the fixing members 74a and 74f that might be caused by the bending-induced force exerted on the wire harness 60. The sliding portion 90 is provided at any position between the fixing member 74a and the fixing member 74f, for example. In the present embodiment, the wire harness 60 includes one sliding portion 90 between the fixing member 74d and the fixing member 74e.

As shown in FIG. 6, the sliding portion 90 is a section in which the second end portion 721b of the first protective member 721 and the second end portion 722b of the second protective member 722 overlap with each other in the longitudinal direction so as to slide on each other.

The first waterproof member 731 extends beyond the tip of the second end portion 721b of the first protective member 721 and covers the surface of the second waterproof member 732. Therefore, the tip of the first protective member 721 is not exposed to the outside of the wire harness 60. The second waterproof member 732 extends beyond the tip of the second end portion 722b of the second protective member 722 and covers the surface of the cable 70. The first protective member 721 covers the second end portion 722b of the second protective member 722 from the outside of the second waterproof member 732.

In the sliding portion 90, the first protective member 721 and the first waterproof member 731 are provided on the outer side of the second protective member 722 and the second waterproof member 732. Thus, in the sliding portion 90, the cable 70, the second protective member 722, the second waterproof member 732, the first protective member 721, and the first waterproof member 731 are arranged in that order from the radially inner side. In other words, the sliding portion 90 has a four-layer structure on the outer side of the cable 70. The ring portions 75 of the fixing members 74 are not wound around the sliding portion 90. The fixing members 74a to 74d are attached to the surface of the first waterproof member 731. The fixing members 74e to 74f are attached to the surface of the second waterproof member 732. The sliding portion 90 is provided between the fixing member 74d and the fixing member 74e.

Next, operation of the wire harness 60 will be described. When a pulling force is applied to the wire harness 60 in the direction dr2, the second protective member 722 is pulled toward the second connector 80b. Then, the second end portion 722b of the second protective member 722 slides with respect to the second end portion 721b of the first protective member 721, so that the second protective member 722 moves in a direction away from the first protective member 721. The pulling force in the direction of dr2, which is generated in the wire harness 60, does not transfer to the first protective member 721. The position of the first protective member 721 thus does not change. Therefore, the positions of the fixing members 74a to 74d attached to the first waterproof member 731 covering the first protective member 721 do not change. Since the fixing member 74f is provided at a position farther from the sliding portion 90 than the fixing member 74e attached to the second waterproof member 732, the position of the fixing member 74f is less likely to change than the fixing member 74e.

Figure 7:
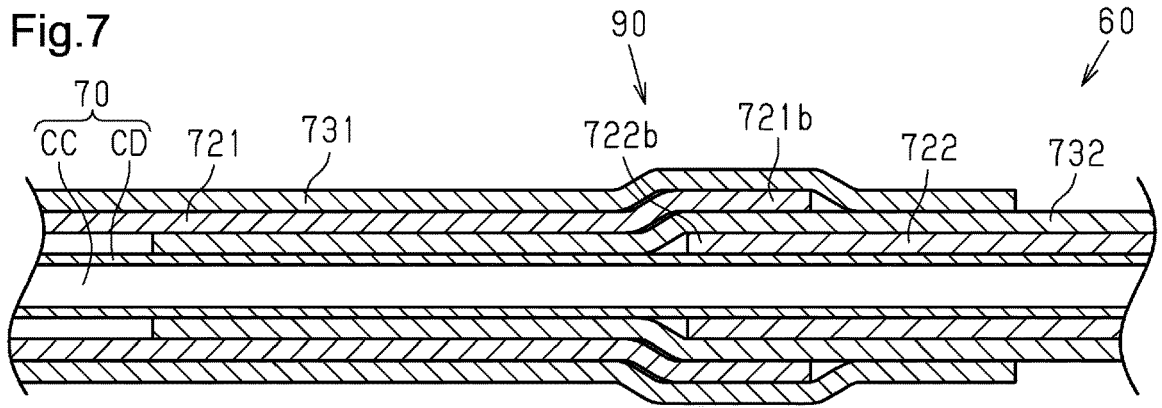
FIG. 7 is a diagram showing an example of a sliding action of the sliding portion shown in FIG. 6.

Similarly, as shown in FIG. 7, when a pulling force is applied to the wire harness 60 in the direction dr1, the first protective member 721 is pulled toward the first connector 80a. Then, the second end portion 721b of the first protective member 721 slides with respect to the second end portion 722b of the second protective member 722, so that the first protective member 721 moves in a direction away from the second protective member 722. The pulling force in the direction of dr1, which is generated in the wire harness 60, does not transfer to the second protective member 722. The position of the second protective member 722 thus does not change. Therefore, the positions of the fixing members 74e to 74f attached to the second waterproof member 732 covering the second protective member 722 do not change. In the first protective member 721, the fixing member 74a is provided at a position farther from the sliding portion 90 than the other fixing members 74b to 74d. Thus, the position of the fixing member 74a is less likely to change than the fixing members 74b to 74d.

[Advantages of Wire Harness 60 and Motor-Driven Compressor 10 of Present Embodiment]

The present embodiment, which has been described above, achieves the following advantages.

(1) The wire harness 60 includes the sliding portion 90, in which the second end portion 721b of the first protective member 721 and the second end portion 722b of the second protective member 722 overlap with each other in the longitudinal direction so as to slide on each other. The sliding portion 90 is provided between the fixing member 74d and the fixing member 74e. When a force that bends the wire harness 60 is applied to the wire harness 60, the movement of the first protective member 721 and the second protective member 722, to which the force is applied, results in sliding of the second end portion 721b and the second end portion 722b in the sliding portion 90. This reduces the movement of the fixing member 74a, which is closest to the first connector 80a, and the fixing member 74f, which is closest to the second connector 80b. The fixing member 74a and the fixing member 74f are the fixing members 74 provided at positions farthest from the sliding portion 90 in the first protective member 721 and the second protective member 722, respectively. Therefore, the positions of the fixing member 74a and the fixing member 74f are unlikely to be affected by the sliding of the sliding portion 90. This prevents displacement of the position of the fixing member 74a with respect to the first protective member 721 and displacement of the position of the fixing member 74f with respect to the second protective member 722.

The above-described configuration prevents the designated positions of the fixing member 74a and the fixing member 74f from being displaced when a force is applied to the wire harness 60. Therefore, the wire harness 60 can appropriately fix the fixing member 74a and the fixing member 74f at the mounting positions in the vehicle.

(2) The protective member 72 is made of a material having a specified impact resistance.

When a strong external impact is applied to the wire harness 60, the protective member 72 protects the cable 70 from the impact.

(3) The protective member 72 has a tubular shape and the slit OP extending over the entire length.

This configuration allows the cable 70 to be readily accommodated in the protective member 72 as compared to a case in which the protective member 72 does not have the slit OP. Therefore, the wire harness 60 can be manufactured easily.

(4) The wire harness 60 includes the waterproof member 73.

This configuration improves the waterproof performance of the wire harness 60 as compared to a case in which the wire harness 60 does not have the waterproof member 73.

(5) The first waterproof member 731 extends beyond the second end portion 721b of the first protective member 721 in the longitudinal direction so as to cover the entire second end portion 721b of the first protective member 721. The second waterproof member 732 extends beyond the end portion of the second protective member 722 in the longitudinal direction so as to cover the entire second end portion 722b of the second protective member 722.

With this configuration, the second waterproof member 732 covers the second protective member 722 and part of the cable 70, and the first waterproof member 731 covers the first protective member 721 and another part of the cable 70. Since the cable 70 and the protective member 72 are not exposed from the surface, the waterproof performance of the wire harness 60 is improved.

(6) In a state in which the first connector 80a is connected to the motor-driven compressor 10, the designated positions of the fixing member 74a and the fixing member 74f are prevented from being displaced even if a force is applied to the wire harness 60 due to, for example, bundling of the wire harness 60.

The above described embodiment may be modified as follows. The above-described embodiment and the following modifications can be combined as long as the combined modifications remain technically consistent with each other.

[Modification of Sliding Portion 90]

Figure 8:
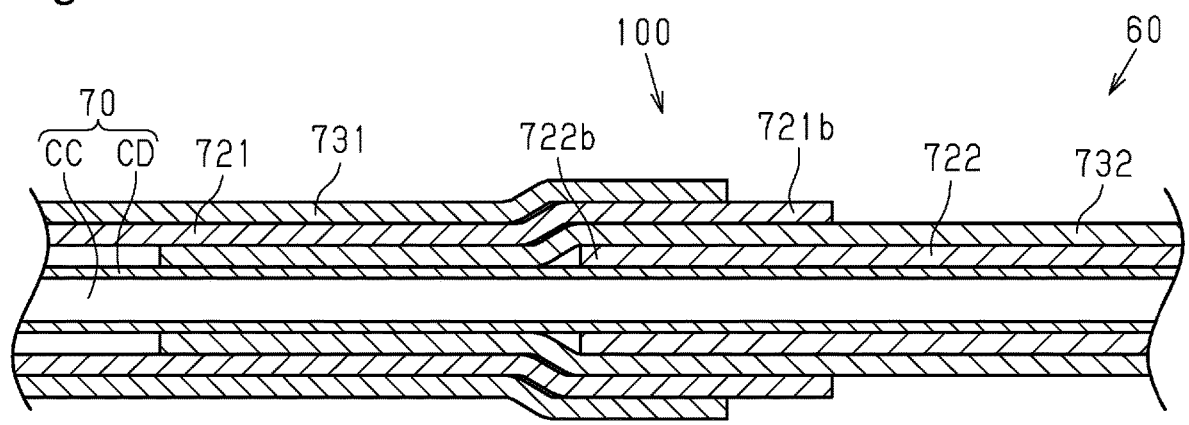
FIG. 8 is an explanatory diagram showing a sliding portion according to a modification.

A wire harness 60 in a modification shown in FIG. 8 includes a sliding portion 100, in which the second end portion 721b of the first protective member 721 and the second end portion 722b of the second protective member 722 overlap with each other in the longitudinal direction so as to slide on each other. The second waterproof member 732 extends beyond the tip of the second end portion 722b of the second protective member 722 and covers the surface of the cable 70. The first protective member 721 covers the second end portion 722b of the second protective member 722 from the outside of the second waterproof member 732. The first waterproof member 731 covers the surface of the first protective member 721, but does not extend beyond the second end portion 721b or cover the entire first protective member 721.

The arrangement order of the cable 70, the first protective member 721, the first waterproof member 731, the second protective member 722, and the second waterproof member 732 in the radial direction is the same as that of the above-described sliding portion 90.

With this configuration, the first waterproof member 731 covers the first protective member 721, but does not extend beyond the second end portion 721b of the first protective member 721 in the longitudinal direction. Therefore, the tip of the first protective member 721 is exposed to the outside of the wire harness 60. The second waterproof member 732 extends beyond the end portion of the second protective member 722 in the longitudinal direction so as to cover the entire second end portion 722b of the second protective member 722. Even when water or dust enters the wire harness 60 from a portion of the first protective member 721 that is not covered with the first waterproof member 731, the second waterproof member 732 is provided inside the portion of the first protective member 721 that is not covered with the first waterproof member 731. The second waterproof member 732 prevents water or dust from entering further into the inner layers. Therefore, the wire harness 60 including the sliding portion 100 reduces the amount of the waterproof member 73 used for manufacturing the wire harness 60 as compared to the wire harness 60 including the sliding portion 90, while ensuring the waterproof performance.

Figure 9:
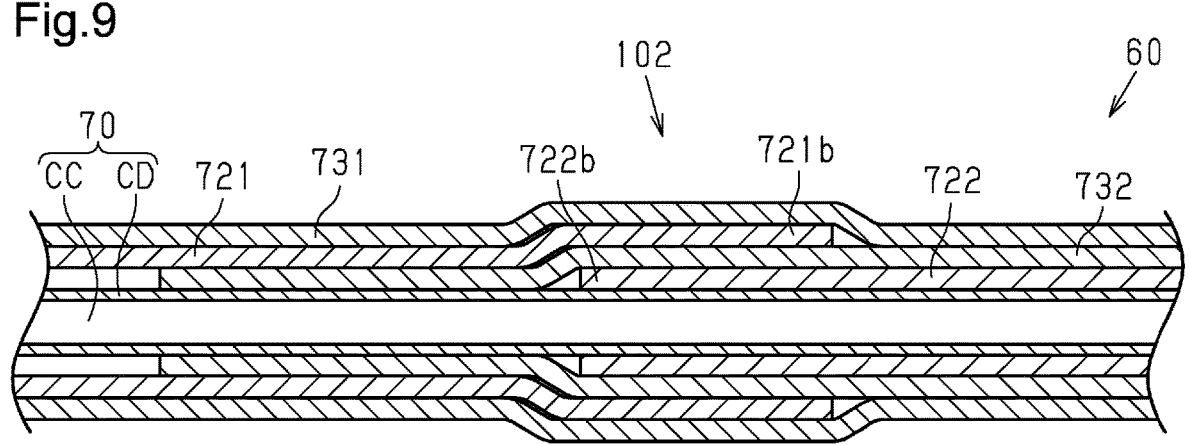
FIG. 9 is an explanatory diagram showing a sliding portion according to a modification.

A wire harness 60 in a modification shown in FIG. 9 includes a sliding portion 102, in which the second end portion 721b of the first protective member 721 and the second end portion 722b of the second protective member 722 overlap with each other in the longitudinal direction so as to slide on each other. The second waterproof member 732 extends beyond the tip of the second end portion 722b of the second protective member 722 and covers the surface of the cable 70. The first protective member 721 covers the second end portion 722b of the second protective member 722 from the outside of the second waterproof member 732. The first waterproof member 731 extends beyond the second end portion 721b to the second end portion 70b of the cable 70, while covering the first protective member 721, and covers the second waterproof member 732 and the second protective member 722.

The arrangement order of the cable 70, the first protective member 721, the first waterproof member 731, the second protective member 722, and the second waterproof member 732 in the radial direction is the same as that of the above-described sliding portion 90.

With this configuration, the first waterproof member 731 covers substantially the entirety of the cable 70 and the protective member 72. In addition, in the wire harness 60 including the sliding portion 102, the end portion of the waterproof member 73 does not exist between the first connector 80a and the second connector 80b, unlike the wire harness 60 including the sliding portion 90 or the sliding portion 100. Therefore, the wire harness 60 including the sliding portion 102 prevents water or dust from entering from the end portion of the waterproof member 73 and further improves the waterproof performance of the wire harness 60.

Although the above-described embodiment provides a case in which the wire harness 60 includes the waterproof member 73, the present disclosure is not limited thereto. The wire harness 60 does not necessarily need to include the waterproof member 73. In this case, the fixing members 74 are provided on the surface of the protective member 72.

Although the above-described embodiment provides a case in which the protective member 72 has the slit OP, the present disclosure is not limited thereto. When the protective member 72 does not have the slit OP, the wire harness 60 is manufactured by inserting the cable 70 from one end to the other end of the tubular protective member 72.

The protective member 72 does not necessarily need to have a tubular shape. For example, the protective member 72 may be a sheet-shaped member and may be used to cover the cable 70 in the circumferential direction. The protective member 72 may be a tape-shaped member, and may be spirally wound around the cable 70.

The wire harness 60 may include multiple cables 70. In this case, the protective member 72 collectively accommodates the cables 70. This configuration reduces the amount of the protective member 72 and the waterproof member 73 used for manufacturing the wire harness 60, as compared to a case in which the cables 70 are each covered with the protective member 72 and the waterproof member 73.

The shape of the second connector 80b may be different from the shape of the first connector 80a shown in FIG. 2. For example, the second connector 80b may have a shape conforming to a connector receiving portion of an external power supply or a connector receiving portion of a controller.

Although the above-described embodiment provides a case in which the wire harness 60 includes one sliding portion 90, the present disclosure is not limited thereto. The wire harness 60 may include multiple sliding portions 90 by including three or more protective members 72 arranged in the longitudinal direction. In this case, it is desirable that the sliding portions 90 be positioned adjacent to each other in the longitudinal direction of the cable 70, with no fixing members 74 positioned between these sliding portions 90.

Although the above-described embodiment provides a case in which the six fixing members 74 are provided in the wire harness 60, the present disclosure is not limited thereto. It would be sufficient to provide at least one fixing member 74 on each of the first protective member 721 and the second protective member 722.

The above-described embodiment provides a case in which the first protective member 721 and the first waterproof member 731 are provided on the radially outer side of the second protective member 722 and the second waterproof member 732, in the sliding portion 90. However, the present disclosure is not limited thereto. In the sliding portion 90, the cable 70, the first protective member 721, the first waterproof member 731, the second protective member 722, and the second waterproof member 732 may be disposed in that order from the radially inner side.

In the above-described embodiment, the compression unit 16 is not limited to a scroll type, but may be, for example, a piston type or a vane type.

In the above-described embodiment, the motor-driven compressor 10 is used in the vehicle air conditioner 23. However, the motor-driven compressor 10 may be used in other apparatuses. For example, the motor-driven compressor 10 may be mounted on a fuel cell electric vehicle and may use the compression unit 16 to compress air, which is a fluid supplied to the fuel cell.

The term "annular" as used in this description may refer to any structure that forms a loop as a whole. "Annular" shapes include but are not limited to a circular shape, an elliptic shape, and a polygonal shape with sharp or rounded corners. "Tubular" shapes include but are not limited to any structure having circular cross-sectional shape, an elliptic cross-sectional shape, and a polygonal cross-sectional shape with sharp or rounded corners.

The invention claimed is:

1. A wire harness, comprising:
a cable;
a first connector provided at one end of the cable;
a second connector provided at another end of the cable;
protective members covering the cable, the protective members being arranged side by side in a longitudinal direction of the cable;
a first fixing member provided on one of the protective members that is closest to the first connector, the first fixing member being configured to fix the wire harness to a mounting target; and
a second fixing member provided on one of the protective members that is closest to the second connector, the second fixing member being configured to fix the wire harness to the mounting target, wherein
the cable is covered with the protective members in an entire region between the first fixing member and the second fixing member, and
end portions of each pair of the protective members that are adjacent to each other in the longitudinal direction overlap with each other to slide on each other, thereby forming a sliding portion.

2. The wire harness according to claim 1, further comprising
a waterproof member that covers the protective members, wherein
the first fixing member and the second fixing member are provided on the protective members via the waterproof member.

3. A motor-driven compressor, comprising:
the wire harness according to claim 1;
a compression unit configured to compress a fluid;
an electric motor configured to drive the compression unit;
an inverter configured to drive the electric motor; and
a housing that accommodates the electric motor,
wherein the first connector is fixed to the housing and electrically connected to the inverter.

* * * * *